(12) United States Patent
Taniguro

(10) Patent No.: US 6,231,159 B1
(45) Date of Patent: May 15, 2001

(54) RECORDING APPARATUS AND METHOD FOR CONTROLLING SUCH RECORDING APPARATUS

(75) Inventor: Masahiro Taniguro, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/031,795

(22) Filed: Feb. 27, 1998

(30) Foreign Application Priority Data

Feb. 28, 1997 (JP) .................................................... 9-045934

(51) Int. Cl.⁷ .................................................... B41J 23/00
(52) U.S. Cl. .............................................. 347/37; 347/104
(58) Field of Search ................................. 347/8, 37, 104; 346/134; 400/706, 708, 709, 582, 279, 633

(56) References Cited

U.S. PATENT DOCUMENTS

| 4,138,102 | 2/1979 | Palmer . |
| 4,953,037 | 8/1990 | Ito et al. . |
| 5,130,807 | 7/1992 | Tanabe et al. . |
| 5,480,247 | 1/1996 | Saikawa et al. . |
| 5,567,069 | 10/1996 | Suzuki et al. . |
| 5,602,571 | * 2/1997 | Suda et al. ............................ 346/134 |
| 5,644,348 | * 7/1997 | Shimoyama et al. .................. 347/37 |

FOREIGN PATENT DOCUMENTS

| 1-10772 | 1/1989 | (JP) . |
| 2-226178 | 9/1990 | (JP) . |
| 3-73940 | 3/1991 | (JP) . |
| 7-1781 | 1/1995 | (JP) . |

* cited by examiner

Primary Examiner—John Barlow
Assistant Examiner—Michael S Brooke
(74) Attorney, Agent, or Firm—Fitzpatrick, Cella, Harper & Scinto

(57) ABSTRACT

When the last line recording is effected by a recording head at a tail end portion of a sheet, the recording head is controlled not to be passed through a lateral edge of the sheet opposite to or remote from a floating preventing portion, whereby a recording apparatus and a method for controlling such a recording apparatus in which a recording range at the tail end portion of the sheet can be increased without interfering with a scanning operation of the recording means regardless of kinds of sheets.

17 Claims, 9 Drawing Sheets

RECORDING APPARATUS AND METHOD FOR CONTROLLING SUCH RECORDING APPARATUS

BACKGROUND OF THE INVENTION

1. Field of the Invention

The present invention relates to a recording apparatus for recording an image on a sheet and a method for controlling such a recording apparatus, and more particularly, it relates to a technique suitable for a recording apparatus of so-called serial scan type for scanning a recording head in a direction perpendicular to a sheet conveying direction.

2. Related Background Art

In conventional recording apparatuses such as printers, copying machines and facsimiles or conventional recording apparatuses used as composite electronic equipment including a computer or a word processor, or a work station, an image is recorded on a sheet such as a paper sheet or a plastic thin film.

Such recording apparatuses can be divided, according to recording types, into ink jet type, wire dot type, thermal type and laser beam type. In recording apparatuses of serial type using a serial scanning system in which the recording is effected by scanning a recording head in a direction (main scanning direction) perpendicular to a sheet conveying direction (sub scanning direction), an image is recorded by a recording head mounted on a carriage shifted along the sheet. After one-line recording is finished, the sheet is conveyed by a predetermined amount (pitch feed or sub scanning) by means of a convey means, and then, next one-line recording is effected with respect to the stopped sheet. By repeating such operations, the entire sheet is recorded.

On the other hand, in recording apparatuses of line type in which the recording is effected only by the sub scanning in the sheet conveying direction, the sheet is set at a predetermined recording position. And, after one-line recording is effected collectively, the sheet is conveyed by a predetermined amount (pitch feed), and then, next one-line recording is effected collectively. By repeating such operations, the entire sheet is recorded.

Among the above-mentioned recording types, a recording apparatus of ink jet type (in jet recording apparatus) in which the recording is effected by discharging ink from the recording head toward the sheet had advantages that the recording means can easily be made compact, a highly fine image can be recorded at a high speed, the recording can be effected to a normal sheet without special treatment, running cost is cheap, recording noise is small because of non-impact system, and a color image can easily be recorded by using multi color inks.

Particularly, in a recording apparatus of ink jet type in which the ink is discharged by utilizing thermal energy, since a recording head having high density liquid passage arrangement (discharge opening arrangement) can easily be manufactured by forming electrical/thermal converters formed on a substrate, electrodes liquid passage walls and a top wall through semiconductor manufacturing process such as etching, deposition and sputtering, the apparatus can be made more compact.

Now, an example of the conventional recording apparatus of serial scan type will be explained with reference to FIGS. 9 and 10. In FIG. 9, a pinch roller 102 is urged against a convey roller 101 for conveying a sheet P. A sensor lever 103 rockable around a shaft 103a is disposed at an upstream side (in a sheet conveying direction) (referred to merely as "upstream side" hereinafter) of the convey roller 101. When the sheet P abuts against a flag 103b of the sensor lever 103 to rotate the sensor lever 103 around the shaft 103a, a tail end detection sensor 104 is operated by a sensor operating portion 103c of the sensor lever 103, thereby detecting passage of the sheet P.

At a downstream side (in the sheet conveying direction) (referred to merely as "downstream side" hereinafter) of the convey roller 101, a recording head 105 for recording an image in response to image information is mounted on a carriage shiftable in a direction (main scanning direction) perpendicular to the sheet conveying direction, and a platen 106 for supporting a rear surface of the sheet P is opposed to the recording head 105.

A discharge roller 108 rotated at the same peripheral speed via a transmission roller 107 is disposed at the downstream side of the recording head 105, and a spurred roller 109 is urged against the discharge roller 108.

With the arrangement as mentioned above, in a condition that a tail end Pb of the sheet P is conveyed the downstream side of a nip n between the convey roller 101 and the pinch roller 102, since the sheet P is spaced apart from the convey roller 101, the sheet is subjected to only a conveying force and pinching and supporting action from the discharge roller 108 and the spurred roller 109.

Accordingly, in this condition, since the tail end Pb of the sheet P is not held down, an optimum gap between the recording head 105 and the sheet P is not established due to the floating of the sheet P. If the image is recorded by the recording head 105 in this condition, the recording of a high quality image cannot be expected. Further, if the tail end Pb of the sheet P is curved toward the recording head 105 or is curled, the sheet P is contacted with the recording head 105, thereby contaminating the sheet.

That is to say, generally, in the recording apparatus of serial scan type, after the tail end Pb of the sheet P has passed through the nip n between the convey roller 101 and the pinch roller 102, it is difficult to ensure the quality of the image.

Nevertheless, when the usage as a recording apparatus such as a facsimile or a copying machine is considered, there is strong request that the image is recorded on the entire recording surface of the sheet P. To this end, as shown in FIG. 10, there has been proposed a technique in which there are provided a floating preventing portion 106a (provided on the platen 106) for holding down an upper surface of the sheet at one lateral edge Pr (convey reference side) thereof along the sheet conveying direction to prevent the lateral edge Pr from floating, and a jam preventing rib portion 105a (provided on a lower surface of the carriage on which the recording head 105 is mounted) for preventing the sheet jam caused if a floating opposite lateral edge Pl (opposite to the lateral edge Pr) of the sheet abuts against the recording head 105.

With this arrangement, since the lateral edge Pr of the sheet P is pinched between an upper surface of the platen 106 and the floating preventing portion 106a, at least a distance $\{L_1-L_2\}$ shown in FIG. 10 is maintained to separate the sheet from the nozzle surface of the recording head 105. Further, if the other lateral edge Pl of the sheet P is floating, since the floating lateral edge Pl is retarded from the recording head 105 by the jam preventing rib portion 105a provided on the carriage on which the recording head 105 is mounted, the sheet jam caused by abutting the recording head 105 against the sheet P can be prevented.

Recently, there has been strong request for effecting the recording with respect to various kinds of sheets, and the recording apparatuses has to cope with such request. However, in the above-mentioned conventional example, when a sheet P having very strong rigidity, if a tail end Pb of the sheet P is curved upwardly and the recording is effected up to the vicinity of the tail end Pb of the sheet P, during a return stroke of the recording head 105 after the scanning, there is a danger for abutting the other lateral edge Pl of the sheet P against the jam preventing rib portion 105a provided on the carriage to prevent the shifting movement of the carriage on which the recording head 105 is mounted.

SUMMARY OF THE INVENTION

The present invention aims to eliminate above-mentioned conventional drawbacks, and an object of the present invention is to provide a recording apparatus and a method for controlling such a recording apparatus, in which a recording range at a tail end portion of a sheet can be widened without preventing a scanning operation of a recording means even when various kinds of sheets are used.

To achieve the above object, according to the present invention, there is provided a recording apparatus comprising a first sheet convey means for conveying a sheet, a recording means provided at a downstream side of the first sheet convey means in a sheet conveying direction and adapted to scan in a direction perpendicular to the sheet conveying direction to record an image on the sheet, a second sheet convey means provided at a downstream side of the recording means in the sheet conveying direction and adapted to convey the sheet, a floating preventing member disposed between the first and second sheet convey means in the sheet conveying direction and adapted to hold down an upper surface of the sheet at one lateral edge thereof parallel with the sheet conveying direction thereby to prevent the one lateral edge of the sheet from floating, a tail end detection means provided at an upstream side of the first sheet convey means in the sheet conveying direction and adapted to recognize a position of a tail end of the sheet by detecting the tail end of the sheet being conveyed, and a control means for controlling so that the recording means does not pass through a position of the other lateral edge opposite to the one lateral edge of the sheet which is prevented from floating by the floating preventing member when the last line recording is effected by the recording means after the tail end of the sheet has been passed through the first sheet convey means to be released from the supporting of the first sheet convey means.

Since the recording apparatus according to the present invention is constructed as mentioned above, after the tail end of the sheet is released from the supporting of the first sheet convey means, when the last line recording is effected by the recording means, by controlling, by means of the control means, so that the recording means does not pass through the position of the other lateral edge (of the sheet) which is not prevented from floating by the floating preventing member, the recording means does not abut against the sheet. Thus, even when a sheet having relatively great rigidity is used, the scanning operation of the recording means is not obstructed by abutting the recording means against the sheet, with the result that the recording range at the tail end portion of the sheet can be widened.

In this case, it is preferable that, in a condition that the recording means is retarded to a position out of the other lateral edge opposite to the one lateral edge of the sheet which is prevented from floating by the floating preventing member, the sheet is conveyed by the second sheet convey means to discharge the sheet from a recording area of the recording means, and, thereafter, the recording means is returned to a record start position.

The present invention further provides a method for controlling a recording apparatus including a first sheet convey means for conveying a sheet, a recording means provided at a downstream side of the first sheet convey means in a sheet conveying direction and adapted to scan in a direction perpendicular to the sheet conveying direction to record an image on the sheet, a second sheet convey means provided at a downstream side of the recording means in the sheet conveying direction and adapted to convey the sheet, and a tail end detection means provided at an upstream side of the first sheet convey means in the sheet conveying direction and adapted to recognize a position of a tail end of the sheet by detecting the tail end of the sheet being conveyed, in which, if the position of the tail end of the sheet is not detected by the tail end detection means or it is recognized that the tail end of the sheet detected by the tail end detection means is positioned at an upstream side of the first sheet convey means in the sheet conveying direction and if it is not recognized that the tail end of the sheet has been passed through the first sheet convey means to be released from the supporting of the first sheet convey means in the sheet conveyance after next scanning of the recording means, after one scanning of the recording means is finished, the sheet is conveyed by a predetermined amount and at the same time the recording means is returned to a record start position, and, if it is recognized that the tail end of the sheet detected by the tail end detection means is positioned at the upstream side of the first sheet convey means is the sheet conveying direction and if it is recognized that the tail end of the sheet has been passed through the first sheet convey means to be released from the supporting of the first sheet convey means in the sheet conveyance after the next scanning of the recording means and if one further scanning of the recording means is required with respect to non-recorded image information regarding the sheet, or, if it is recognized that the tail end of the sheet has been passed through the first sheet convey means to be released from the supporting of the first sheet convey means and the sheet is positioned within a record permitting area of the recording means and if one further scanning of the recording means is required with respect to the non-recorded image information regarding the sheet, after one scanning of the recording means is finished, i.e., after the recording in the sheet is finished, the recording means is retarded from the lateral edge of the sheet by shifting the recording means toward a direction opposite to the record start position, and, thereafter, the sheet is discharged from the recording area of the recording means.

With this arrangement, if the sheet is positioned within a range where the sheet is not released from the supporting of the first sheet convey means, at the same time when the sheet is conveyed, the recording means can be returned to the record start position, and, if one further scanning of the recording means is required with respect to the non-recorded image information and if the sheet is positioned within a range where the sheet is released from the supporting of the first sheet convey means, after one scanning of the recording means is finished, the recording means is retarded from the lateral edge of the sheet by shifting the recording means toward the direction opposite to the record start position, and, thereafter, by discharging the sheet from the recording area of the recording means, the recording means does not abut against the sheet. Thus, even when a sheet having relatively great rigidity is used, the scanning operation of the recording means is not obstructed by abutting the recording means against the sheet, with the result that the recording range at the tail end portion of the sheet can be widened.

DETAILED DESCRIPTION OF THE PREFERRED EMBODIMENTS

Figure 1:
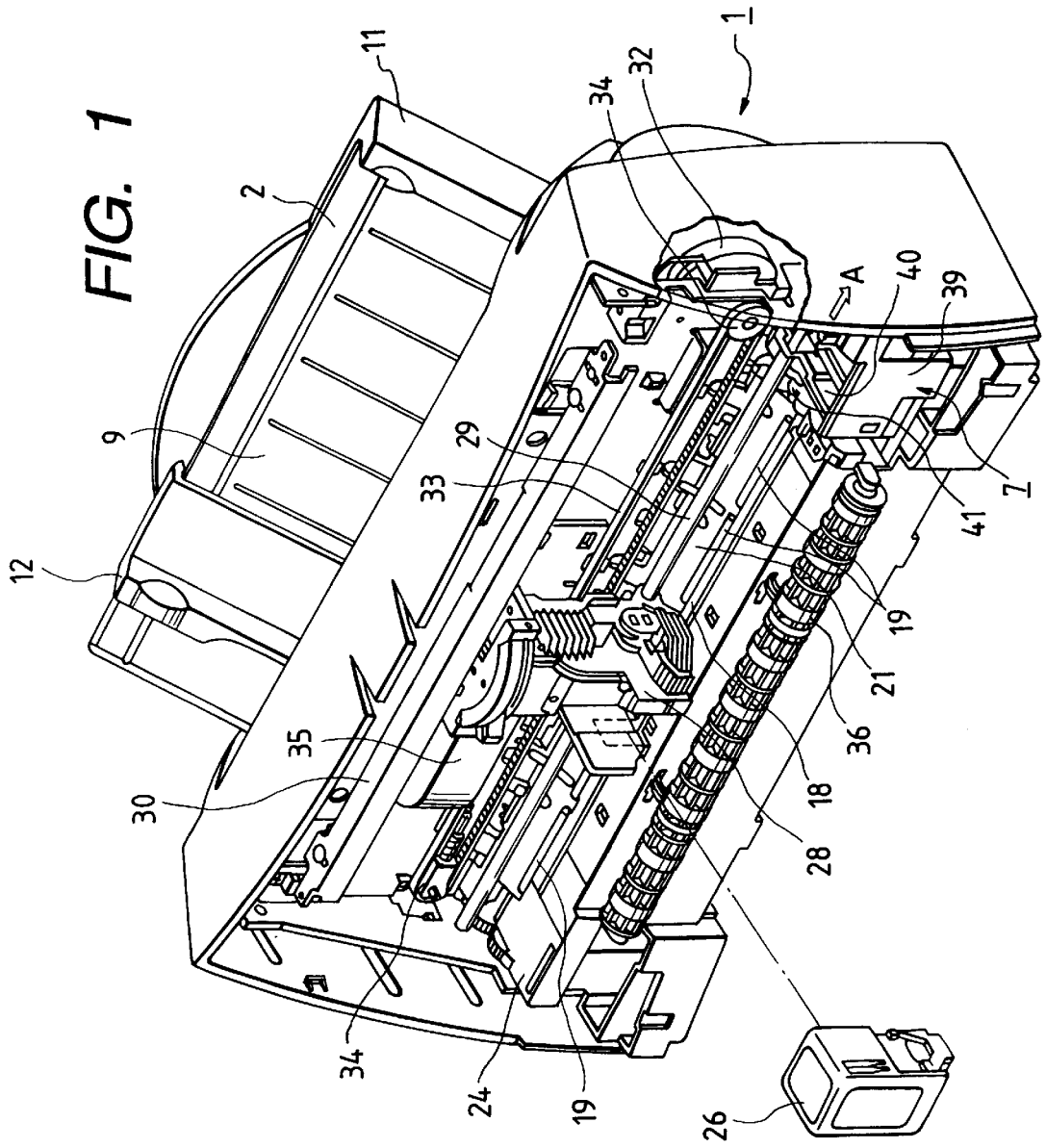
FIG. 1 is a perspective view of a recording apparatus according to the present invention.
Figure 2:
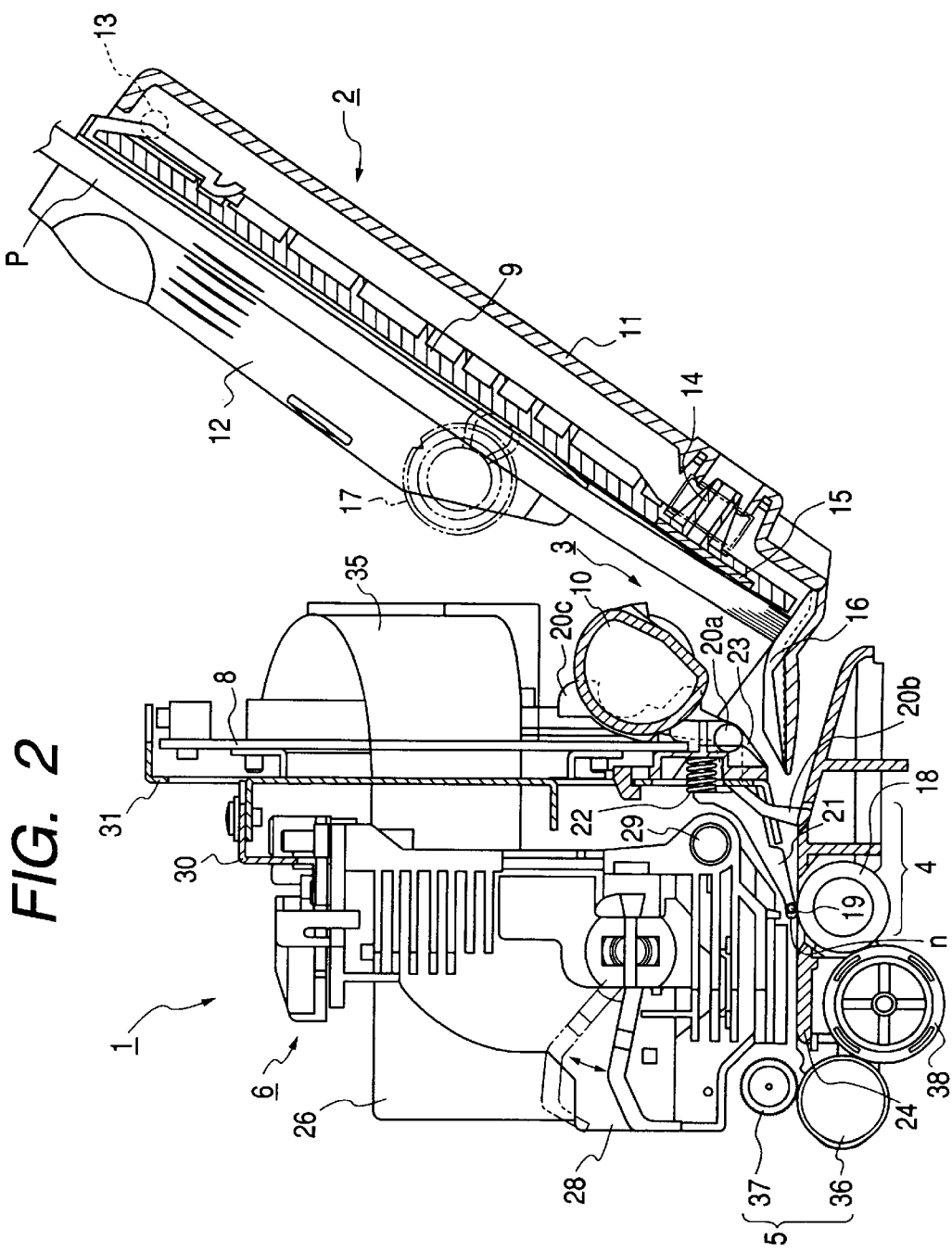
FIG. 2 is a sectional view of the recording apparatus according to the present invention.
Figure 3:
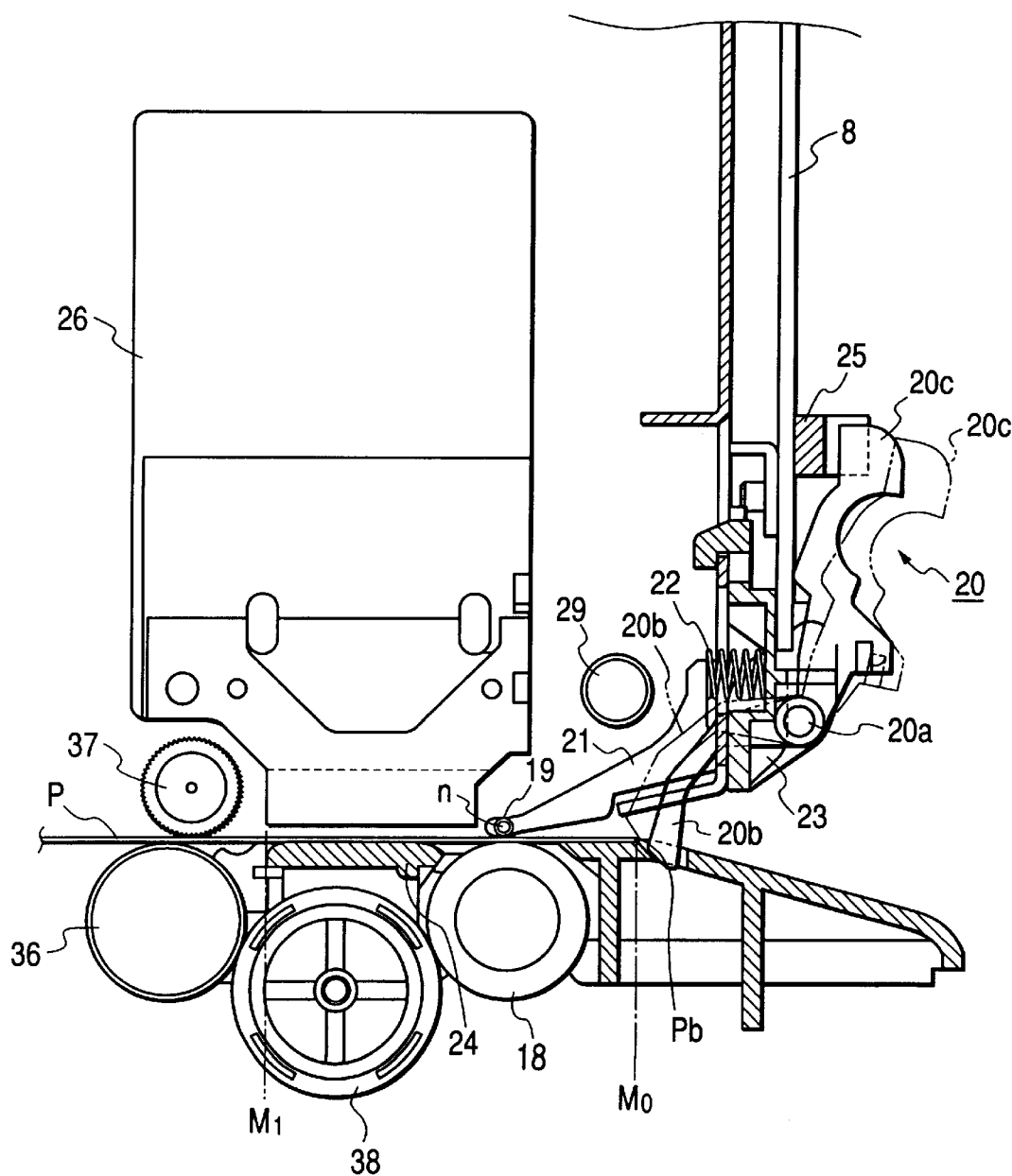
FIG. 3 is a sectional view showing a main part of the recording apparatus according to the present invention.
Figure 4:
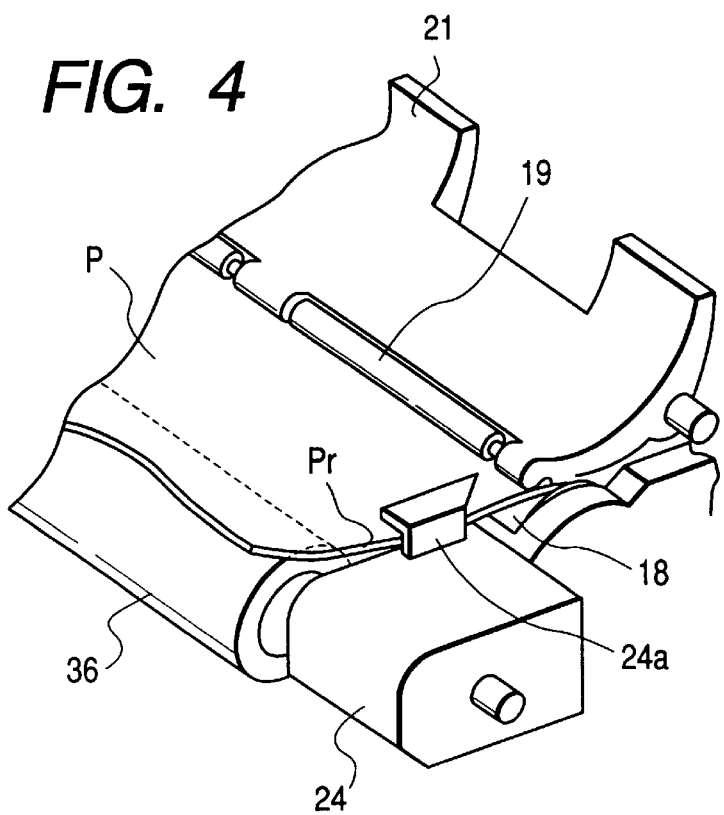
FIG. 4 is a perspective view of a floating preventing member.
Figure 5:
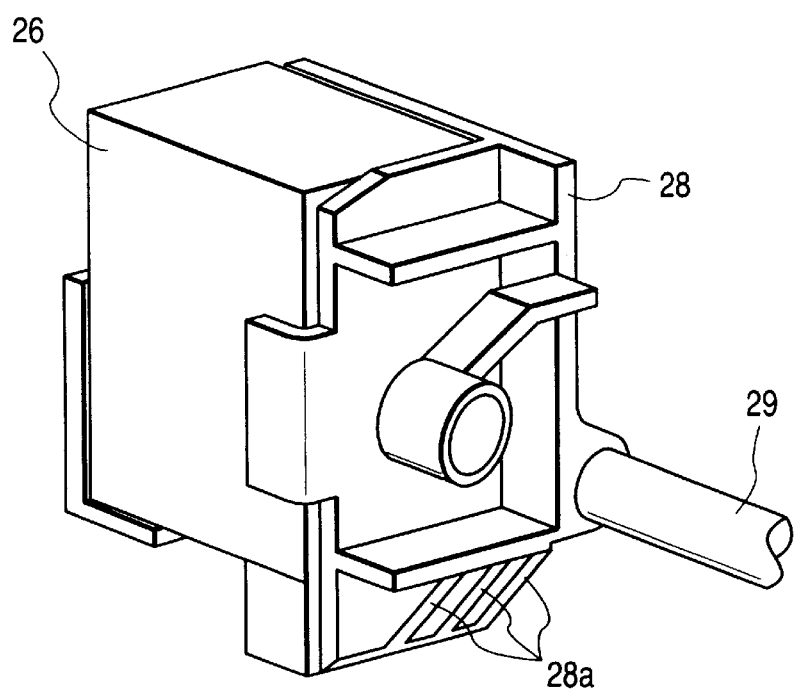
FIG. 5 is a perspective view of a jam preventing rib provided on a carriage on which a recording head is mounted.
Figure 6:
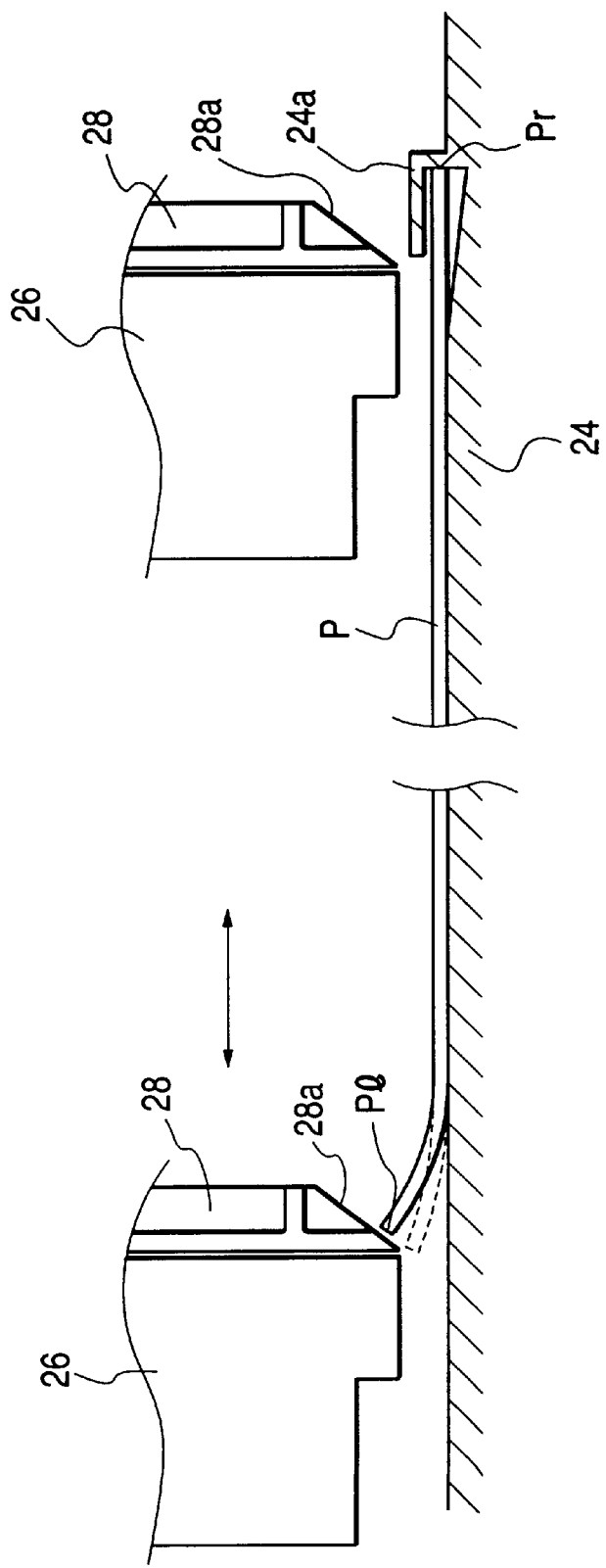
FIG. 6 is an explanatory view for explaining functions of the floating preventing member and the jam preventing rib acting on a sheet.
Figure 7:
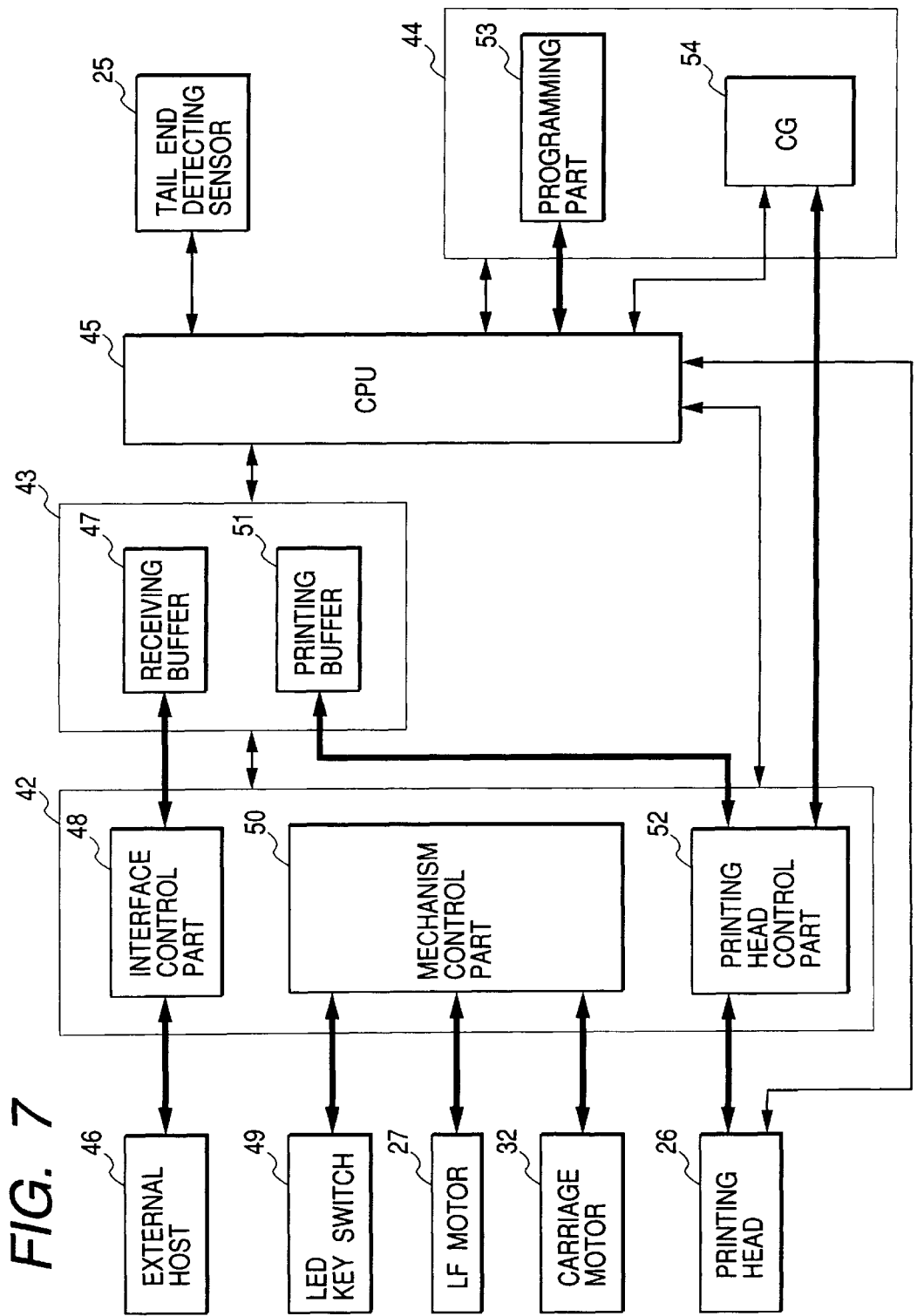
FIG. 7 is a block diagram of a control system of the recording apparatus according to the present invention.
Figure 8:
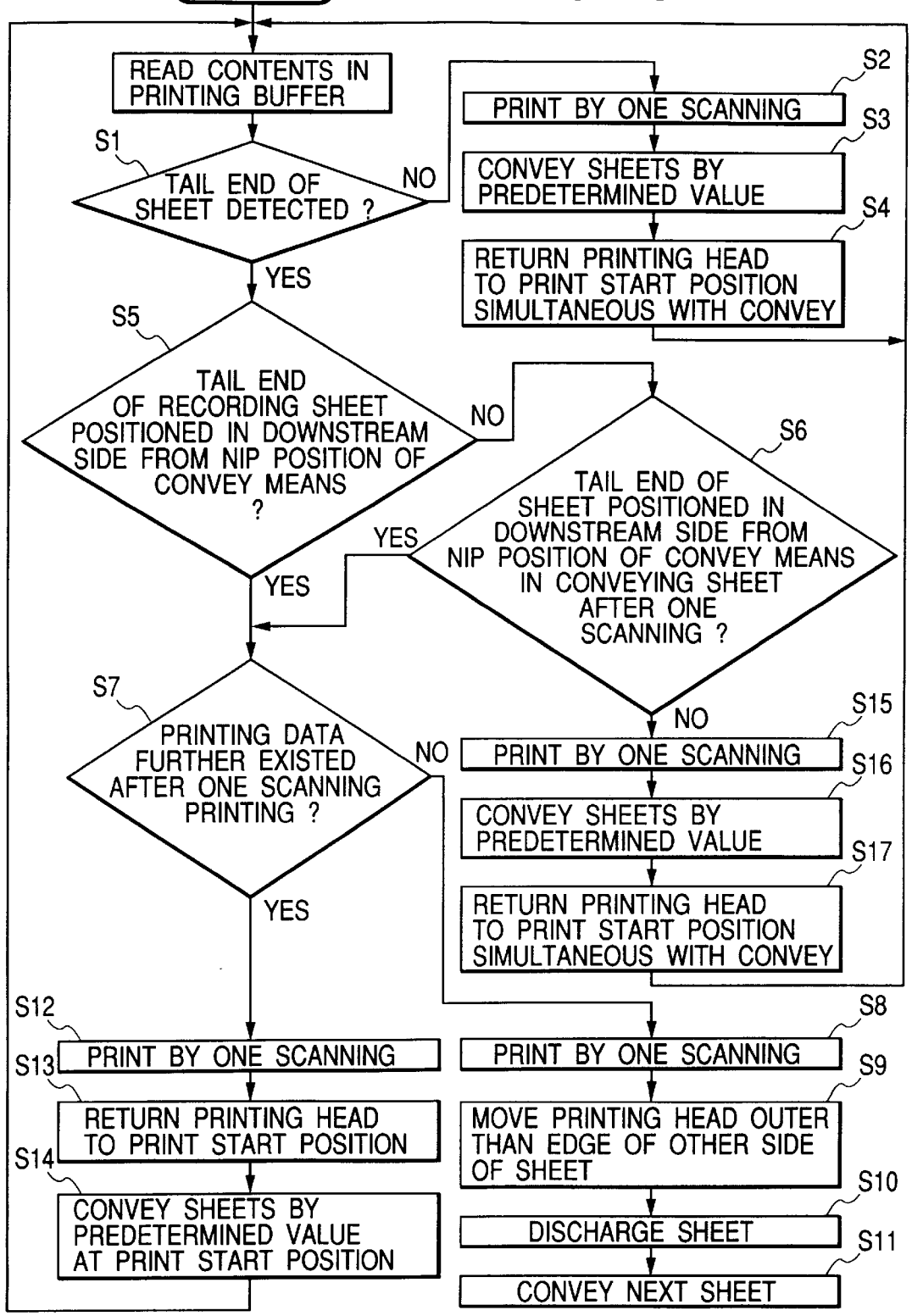
FIG. 8 is a flow chart for the control system.
Figure 9:
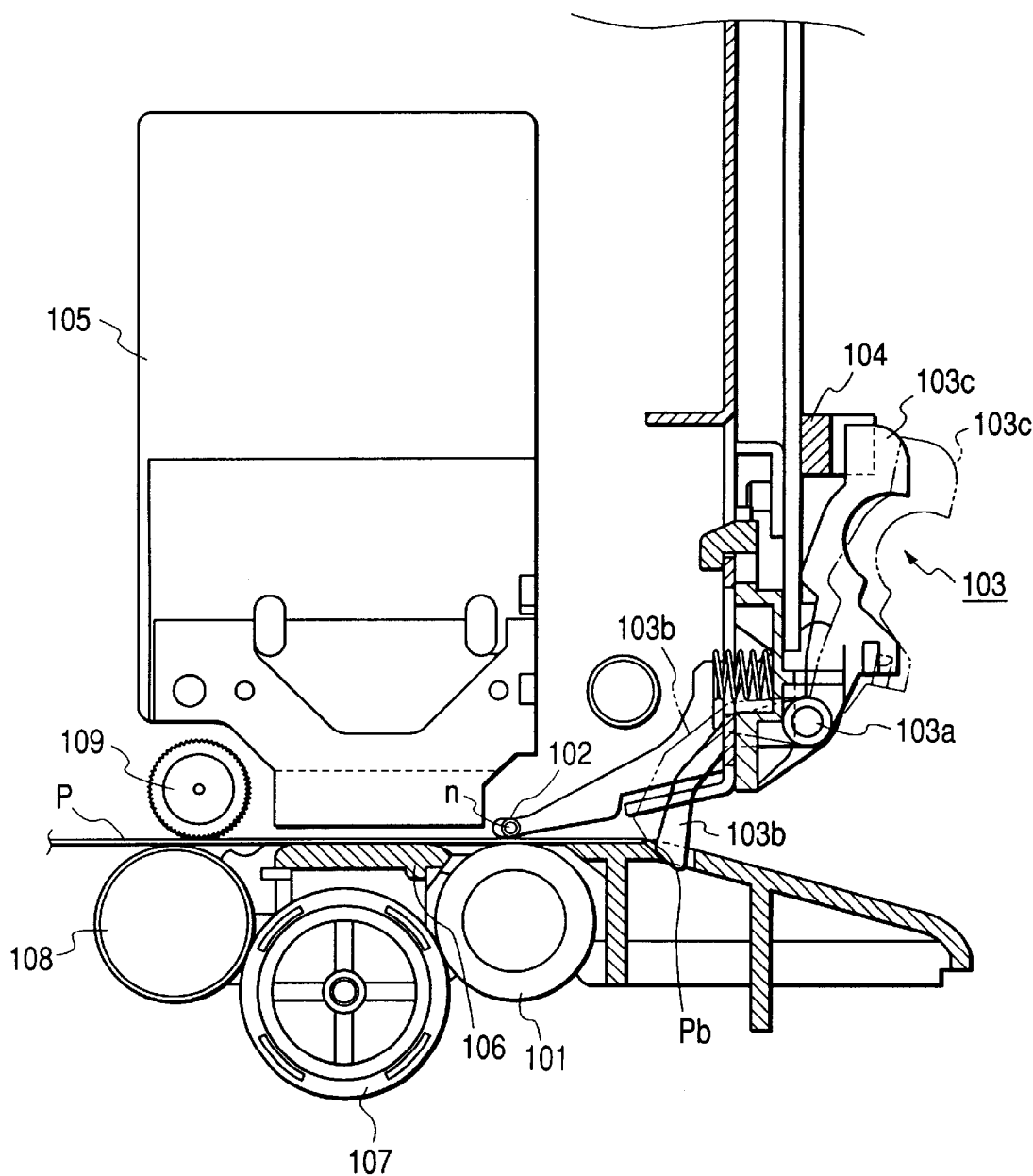
FIG. 9 is a view showing a conventional technique.
Figure 10:
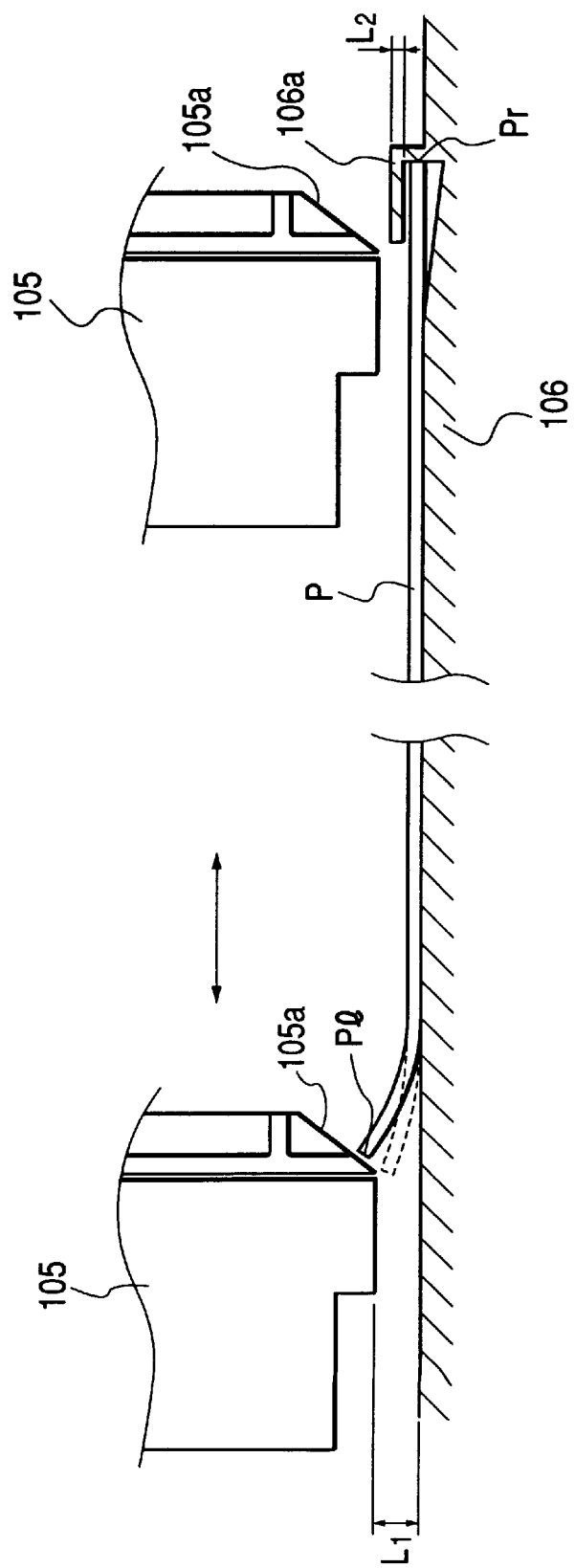
FIG. 10 is a view showing another conventional technique.

As a recording apparatus and a method for controlling such a recording apparatus according to the present invention, a preferred embodiment in which the present invention is applied to an ink jet recording apparatus will be fully explained with reference to the accompanying drawings. FIG. 1 is a perspective view of a recording apparatus according to the present invention, FIG. 2 is a sectional view of the recording apparatus according to the present invention, FIG. 3 is a sectional view showing a main part of the recording apparatus according to the present invention, FIG. 4 is a perspective view of a floating preventing member, FIG. 5 is a perspective view of a jam preventing rib provided on a carriage on which a recording head is mounted, FIG. 6 is an explanatory view for explaining functions of the floating preventing member and the jam preventing rib acting on a sheet, FIG. 7 is a block diagram of a control system of the recording apparatus according to the present invention, and FIG. 8 is a flow chart for the control system.

First of all, the entire construction of the recording apparatus according to the present invention will be described with reference to FIGS. 1 to 7. In FIGS. 1 and 2, a recording apparatus having an automatic sheet supplying apparatus 2 for automatically supplying sheets P made of paper, resin or the like includes a sheet supply portion 3, a sheet convey portion 4, a sheet discharge portion 5, a carriage portion 6, a cleaning portion 7 and an electric substrate 8.

The sheet supply portion 3 includes a pressure plate 9 on which the sheets P set in the automatic sheet supplying apparatus 2 are rested, and a sheet supply roller 10 adapted to supply the sheets P rested on the pressure plate 9 and attached to a base 11. The pressure plate 9 is provided with a movable side guide 12 shiftable in a width-wise direction of the sheet to regulate a rested (stacked) position of the sheets P.

The pressure plate 9 can be rotated around a rotary shaft 13 provided on the base 11 and is biased toward the sheet supply roller 10 by a pressure plate spring 14. A separation pad 15 formed from material having great coefficient of friction such as synthetic leather and adapted to prevent double-feed of the sheets P is provided on a portion of the pressure plate opposed to the sheet supply roller 10.

Further, the base 11 is provided with a separation pawl (not shown) for covering one corner of the sheet stack P and for separating the sheets P one by one, a bank portion 16 integrally formed with the base 11, and a release cam 17 for releasing engagement between the pressure plate and the sheet supply roller 10.

With the arrangement as mentioned above, in a waiting condition, the pressure plate 9 is lowered to a predetermined position by the release cam 17, so that the pressure plate 9 is disengaged from the sheet supply roller 10. In this condition, when a rotational driving force transmitted to a convey roller 18 constituting a first sheet convey means (described later) is transmitted to the sheet supply roller 10 and the release cam 17 through a gear train, the release cam 17 is separated from the pressure plate 9, with the result that the sheet stack P on the pressure plate is urged against the sheet supply roller 10. As the sheet supply roller 10 is rotated, the supplying of the sheets P is started.

The sheets P are separated one by one by the separation pawl (not shown) and the separated sheet is sent to the sheet supply portion 3. The sheet supply roller 10 and the release cam 17 are rotated until the sheet P is sent to the sheet supply portion 3, and, thereafter the waiting condition that the sheet stack P is disengaged from the sheet supply roller 10 is restored, and the rotational driving force transmitted from the convey roller 18 is not transmitted to the sheet supply roller and the release cam.

The sheet convey portion 4 includes the convey roller (first sheet convey means) and a pinch roller 19 urged against the convey roller 18 and cooperating with the convey roller to pinch and convey the sheet P fed by the sheet supply roller 10, and a sensor lever 20 (FIG. 3) constituting a tail end detection means is disposed at a downstream side of the sheet supply roller 10 and an upstream side of the convey roller 18.

The pinch roller 19 is rotatably held by a pinch roller guide 21 and is biased by a pinch roller spring 22 so that the pinch roller 18 is urged against the convey roller 18 to form a nip n (therebetween) for conveying and supporting the sheet while pinching the sheet.

An upper guide 23 and a platen 24 for guiding the sheet P is disposed at an entrance of the sheet convey portion 4, and the sensor lever 20 for transmitting the detection of tip and tail ends of the sheet P to a tail end detection sensor 25 is provided on the upper guide 23.

As shown in FIG. 3, the sensor lever 20 is rotatably supported on a shaft 20a and is biased by a biasing spring (not shown) so that, when the sheet P is not passed through the sensor lever, a flag 20b of the sensor lever 20 is lowered below a sheet conveying plane toward the platen 24. In this case, a sensor operation portion 20c of the sensor lever 20 blocks a light path of the tail end detection sensor 25, thereby turning the tail end detection sensor 25 OFF.

When the sheet P introduced between and conveyed by the platen 24 and the upper guide 23 abuts against the flag 20b of the sensor lever 20, the sensor lever 20 is rotated around the shaft 20a in a clockwise direction (FIG. 3), with the result that the sensor operation portion 20c of the sensor lever 20 is retarded from the light path of the tail end detection sensor 25, thereby turning the tail end detection sensor 25 ON.

Thus, when the tip end of the sheet P abuts against the sensor lever 20, the tail end detection sensor 25 is switched from OFF to ON, and, after the tail end of the sheet P is passed through the sensor lever 20, the tail end detection sensor 25 is switched from ON to OFF. In this way, the passing timings of the tip end and the tail end of the sheet P can be detected by the tail end detection sensor 25, and, on the basis of the detected information, positions of the tip end and the tail end of the sheet P conveyed through the sheet convey portion 4 can be recognized.

With the arrangement as mentioned above, the sheet P sent by the sheet supply portion 3 is guided by the platen 24, upper guide 23 and pinch roller guide 21 to be introduced into the nip n between the convey roller 18 and the pinch roller 19. In this case, the tip end of the conveyed sheet P is detected by the sensor lever 20, thereby setting a recording position of the sheet P. The sheet P is conveyed while being pinched and supported by the nip n between the convey roller 18 rotated by an LF (line feed) motor (not shown) and the pinch roller 19 rotatingly driven by rotation of the convey roller 18.

The carriage portion 6 includes a carriage 28 disposed at a downstream side of the convey roller 18 and shiftable in a direction (main scanning direction) perpendicular to a sheet conveying direction, and an ink jet recording head (recording means for recording an image in response to image information) 26 is mounted on the carriage 28.

The carriage 28 is supported by a guide shaft 29 for reciprocally scanning the carriage in the direction (main scanning direction) perpendicular to the sheet conveying direction and a guide rail 30 for holding a tail end of the carriage 28 to maintain a gap between the recording head and the sheet P, and the guide shaft 29 and the guide rail 30 are attached to a chassis 31 of the image forming apparatus.

The carriage 28 is driven by a carriage motor 32 attached to the chassis 31 through a timing belt 33. The timing belt 33 is subjected to tension from an idle pulley 34. The carriage 28 is provided with a flexible substrate 35 for transmitting a record signal from an electric substrate 8 to the recording head 26.

With the arrangement as mentioned above, when the image is recorded on the sheet P, the sheet P is conveyed, by the pair of rollers (convey roller 18 and the pinch roller 19), to a line position (position in the sheet conveying direction) where the image is recorded, and the carriage 28 is shifted, by the carriage motor 32, to a row position (position in the direction perpendicular to the sheet conveying direction) where the image is recorded, thereby positioning the recording head 26 at the image recording position. Thereafter, in response to the record signal from the electric substrate 8, the recording head 26 discharges ink toward the sheet P, thereby recording the image on the sheet.

The recording head 26 has fine liquid discharge openings (orifices), liquid passages, energy acting portions provided in the respective liquid passages, and energy generating means for generating liquid droplet forming energy acting on liquids in the acting portions.

As recording methods utilizing such energy generating means for generating energy, there are a recording method using electrical/mechanical converters such as piezo-electric elements, a recording method using energy generating means in which heat is generated by illumination of electromagnetic wave such as laser and liquid droplet is discharged by the action of the heat, and a recording method using energy generating means in which liquid is heated by electrical/thermal converters such as heat generating elements having heat generating resistance bodies to discharge the liquid.

Among these recording methods, a recording head used in an ink jet recording method for discharging liquid by thermal energy can record an image with high resolving power since liquid discharge openings (orifices) for forming and discharging recording liquid droplets can be arranged with high density.

Among such recording heads, recording heads using the electrical/thermal converters as the energy generating means can easily be made compact, can fully utilize merits of IC techniques and micro-working techniques in which progress of technique and improvement of reliability have been remarkable in a recent semi-conductor field, can be mounted with high density and can be manufactured cheaply.

In the illustrated embodiment, while an example that the ink jet recording head is used as the recording means was explained, the recording means may be designed so that an electrical/thermal converter is energized in response to a record signal and ink is discharged from a discharge opening by growth and contraction of a bubble generated in the ink by film boiling caused in the ink by thermal energy generated by the electrical/thermal converter.

It is preferable that typical construction and principle disclosed in U.S. Pat. Nos. 4,723,129 and 4,740,796 are used.

The sheet discharge portion 5 includes a discharge roller (second sheet convey means) 36 disposed at a downstream side of the recording head 26, and a rotatable spurred roller 37 urged against the discharge roller 36, and a transmission roller 38 is urged against the discharge roller 36 and is also urged against the convey roller 18. Accordingly, the rotational driving force of the convey roller 18 is transmitted to the discharge roller 36 via the transmission roller 38, and the spurred roller 37 is rotatingly driven by rotation of the discharge roller 36.

With this arrangement, the sheet P on which the image was formed in the carriage portion 6 is conveyed by the discharge roller 36 and the spurred roller 37 while being pinched and supported by a nip between the discharge roller and the spurred roller, and then is discharged onto a discharge tray (not shown) disposed out of the apparatus.

The cleaning portion 7 includes a pump 39 for cleaning the recording head 26, a cap 40 for suppressing the drying of the recording head 26, and a drive switching arm 41 for switching the driving force from the discharge roller 36 between the sheet supply portion 3 and the pump 39.

When the drive switching arm 41 is positioned at a position other than a supply position for the sheet or a cleaning position for the recording head 26, since a planetary gear (not shown) rotated around a rotary shaft of the convey roller 18 is held stationary at a predetermined position, the driving force is not transmitted to the sheet supply portion 3 and the pump 39.

As the carriage 28 is shifted, when the drive switching arm 41 is shifted in a direction shown by the arrow A (FIG. 1), since the planetary gear becomes a free condition, the planetary gear is shifted in accordance with normal/reverse rotation of the convey roller 18, with the result that, when the convey roller 18 is rotated normally, the driving force is transmitted to the sheet supply portion 3, and, when the convey roller 18 is rotated reversely, the driving force is transmitted to the pump 39.

As shown in FIG. 4, between the convey roller 18 and the discharge roller 36 in the sheet conveying direction, a floating preventing portion (floating preventing member or floating regulating member) 24a for holding-down an upper surface of the sheet at one lateral edge Pr (convey reference side) thereof along the sheet conveying direction to prevent the lateral edge Pr from floating is integrally formed with the platen 24, and, as shown in FIGS. 5 and 6, a jam preventing rib 28a for guiding an opposite lateral edge Pl of the sheet P by abutting against the lateral edge Pl is formed on a lower surface of the carriage 28 on which the recording head 26 is mounted.

With this arrangement, in the case where the rigidity of the sheet P is relatively small, when the recording head 26 disposed out of the position of the other lateral edge Pl of the sheet P is returned to the record start position toward the floating preventing portion 24a, the other lateral edge Pl of the sheet P is guided by the jam preventing rib 28a of the carriage 28 to be lowered toward the platen 24, with the result that the recording head 26 can be returned to the record start position without any trouble.

Next, the construction of the control means of the recording apparatus according to the present invention will be explained with reference to FIG. 7. The electric block diagram shown in FIG. 7 includes a printer controller 42 for carrying out electrical/mechanical control at a high speed with hardware, a RAM (random access memory) 43, a ROM (read only memory) 44, and a CPU (central processing unit) 45 for effecting total control.

The printer controller 42 is a GA having several thousands of gates and includes therein an interface control part 48 for communicating with an external host 46 to receive the image data and for successively accumulating the data in a receiving buffer 47 of the RAM 43, a mechanism control part 50 for controlling the LF motor 27, carriage motor 32, key switch and LED (light emitting diode) 49, and a recording head control part 52 for reforming the image data to a recordable form and accumulating it in a printing buffer 51 and for sending the data to the recording head at a proper timing to effect the recording.

The RAM 43 is divided into the receiving buffer 47 and the printing buffer 51. The printing buffer 51 has a function for storing the data divided so that the recording head 26 becomes a recordable condition just at one scanning.

ROM 44 has a programming part 53 for storing program code controlling the CPU 45, and a CG (character generator) 54 for storing character font data.

The CPU 45 controls the printer controller 42, RAM 43 and ROM 44 in accordance with the program code and always monitors the condition of the tail end detection sensor 25.

With the arrangement as mentioned above, first of all, when the CPU 45 is driven, after the initial check of the image forming apparatus 1 is effected, a waiting condition is established. In this condition, in response to the data from the external host 46 such as an external computer or by manipulating a control button by the operator, the image forming apparatus 1 effects the predetermined operation.

The data received through the interface control part 48 is subjected to data conversion process (treatment) by the CPU 45 while being spooled in the receiving buffer 47 timely, and thereafter, the data is divided into amounts recordable by one scanning of the recording head 26 and is sent to the printing buffer 51.

The data in the printing buffer 51 is timely sent to the recording head 26 through the flexible substrate 35 under the control of the printer controller 42 and the CPU 45. In this case, the CPU 45 drives the carriage motor 32 timely so that the desired image can be recorded at a desired position.

Further, in response to sheet convey command among the data sent from the external host 46 or by manipulating the control button by the operator, the CPU 45 drives the LF motor 27 by a predetermined amount, thereby conveying the sheet P.

Further, the CPU 45 monitors the tail end detection sensor 25 during the conveyance of the sheet so that the CPU controls the passing timing of the tip and tail ends of the sheet P by turning ON/OFF the tail end detection sensor 25 by operating the sensor lever 20 by the tip and tail ends of the sheet P.

Next, the recording control at the tail end portion of the sheet P will be explained with reference to a flow chart shown in FIG. 8. The tail end Pb of the sheet P is detected by turning the tail end detection sensor 25 OFF by blocking the light path of the tail end detection sensor 25 by the sensor operation portion 20c of the sensor lever 20 rotated around the shaft 20a in the clockwise direction (FIG. 3) by the biasing spring (not shown) when the tail end Pb reaches a position $M_0$ in FIG. 3 to be separated from the sensor lever 20. When this timing is stored in the CPU 45, by adding the further convey amount of the sheet P to the stored data timely, the position of the tail end Pb of the sheet P can be recognized.

Before the tail end Pb of the sheet P is detected, since the sheet P is pinched and supported by the nip n between the convey roller 18 and the pinch roller 19, the sheet P is not floating. Thus, before the tail end Pb of the sheet P is detected, the normal recording conveyance control may be effected.

That is to say, in a step S1 in FIG. 8, if the tail end Pb of the sheet P is not detected by the tail end detection sensor 25, immediately after the one scanning recording stored in the printing buffer 51 is effected by the recording head 26 (step S2), the predetermined amount of sheet conveyance is effected (step S3), and, at the same time, the carriage 28 is returned to return the recording head 26 to the record start position (home position) (step S4).

Further, in the step S1, even after the tail end Pb of the sheet P is detected by the tail end detection sensor 25, so long as the tail end Pb of the sheet P passed through the nip n between the convey roller 18 and the pinch roller 19 is still pinched by the nip n, the conveyance control may be effected as described regarding the steps S2 to S4; however, if the tail end Pb of the sheet P passed through the nip n between the convey roller 18 and the pinch roller 19 is released from the nip n, the sheet is not supported, with the result that, when the carriage 28 being returned passes through the other lateral edge Pl of the sheet P which is not held-down by the floating preventing portion 24a, the carriage may abut against the other lateral edge Pl to cause the sheet jam or poor operation of the carriage.

To avoid this, in the illustrated embodiment, in a step S5, even if the tail end Pb of the sheet P is positioned in the upstream side of the nip n between the convey roller 18 and the pinch roller 19, depending on judgement at step S6, control which is similar to the control effected if the tail end Pb of the sheet P is positioned in the downstream side of the nip n between the convey roller 18 and the pinch roller 19 in the step S5 is effected. That is, if it is recognized at the step S6 that, during the sheet conveyance after the next one scanning, the tail end Pb of the sheet P is shifted in the downstream side of the nip n between the convey roller 18 and the pinch roller 19 not to be supported.

The control effected if the tail end Pb of the sheet P is positioned in the downstream side of the nip n between the convey roller 18 and the pinch roller 19 is divided into two in accordance with the number of succeeding recording scanning times.

That is to say, in the next scanning, it is judged whether or not the data to be recorded on the sheet P is finished in a step S7; and, if it is judged that the data to be recorded on the sheet P is finished in the next scanning (i.e., if the next one scanning is the last scanning), after the recording for one scanning stored in the buffer 51 is effected by the recording head 26 (step S8), the carriage 28 does not carry out the returning operation but is shifted out of the other lateral edge Pl of the sheet P opposite to the record start position (step S9). In a condition that the carriage 28 is stopped at this area out of the sheet passing area, the sheet P is discharged (step S10).

By effecting such control, in the last recording effected at the tail end portion of the sheet P, the carriage 28 is prevented from abutting against the other lateral edge Pl of the sheet P to cause the sheet jam or the poor operation of the carriage 28.

After the sheet P is discharged and the tail end Pb of the sheet P is sufficiently spaced apart from the carriage 28, at least when the tail end Pb of the sheet P is discharged up to the downstream side of a position $M_1$ shown in FIG. 3, the carriage 28 is returned to prepare for the next recording to the sheet P (step S11).

In the step S7, if the data to be recorded on the sheet P is not finished in the next scanning, after the recording for one scanning stored in the buffer 51 is effected by the recording head 26 (step S12), the conveyance of the sheet P is not effected, but, the carriage 28 is immediately returned to the record start position (step S13). And, the sheet is conveyed by a predetermined amount in a condition that the carriage 28 is stopped at the record start position (step S14).

Although the carriage 28 is passed through the other lateral edge Pl of the sheet P where the floating preventing portion 24a is not located, in this case, since the sheet P is stopped, there is less danger of abutting the carriage 28 against the other lateral edge Pl of the sheet P.

In the control after the judgement in the step S6, since the carriage 28 can be passed through the other lateral edge Pt of the sheet P in the condition that the sheet P is pinched by the nip n between the convey roller 18 and the pinch roller 19, the carriage 28 is effectively prevented from abutting against the other lateral edge Pl of the sheet P.

In the step S14, in the conveyance of the sheet P effected in the condition that the carriage 28 is stopped at the record start position, since the floating preventing portion 24a is positioned in the vicinity of the carriage 28, the carriage 28 (or the recording head 26) does not contact with the sheet P.

Further, in the step S6, if it is recognized that the tail end Pb of the sheet P is positioned in the upstream side of the nip n between the convey roller 18 and the pinch roller 19 in the sheet conveyance after the next one scanning, the control similar to the steps S2 to S4 is effected (steps S15 to S17).

In the illustrated embodiment, while an example that the inconvenience of the last line recording at the tail end portion of the sheet P is eliminated was explained, as another arrangement, in a recording apparatus in which the recordable area is previously set to be relatively small, the recording area can be increased by an effective recording width of the recording head 26 at the maximum by using the similar construction as the above-mentioned embodiment.

The recording apparatus may be applied to a copying apparatus in combination with a reader or a facsimile having a transmission function, as well as an image outputting terminal device of an information processing equipment such as a computer.

While an example that the ink jet recording head is used as the recording means was explained, the recording system of the present invention is not limited to the ink jet recording system, but, for example, a heat transfer recording system, a photosensitive recording system, an impact recording system such as a wire dot recording system or other recording systems can be used.

Since the recording apparatus and the method for controlling such a recording apparatus according to the present invention has the above-mentioned construction and function, regardless of material, curvature curl and thickness of the sheet, in the recording operation at the tail end portion of the sheet, the sheet jam and the poor operation of the recording means can be prevented, and the recording range at the tail end portion of the sheet can be increased, and the recording apparatus having high reliability can be provided.

Further, the recording area can be increased by the effective recording width of the recording head 26 at the maximum.

What is claimed is:

1. A recording apparatus comprising:
   a first sheet convey means for conveying a sheet;
   a recording means provided at a downstream side of said first sheet convey means in a sheet conveying direction to scan in a direction perpendicular to the sheet conveying direction to record an image on the sheet, wherein said recording means effects recording while scanning from a record start position outside of one lateral edge of the conveyed sheet in a direction transverse to the sheet conveying direction and returns to the record start position after the scanning;
   a second sheet convey means provided at a downstream side of said recording means in the sheet conveying direction to convey the sheet;
   a floating preventing member disposed between said first and second sheet convey means in the sheet conveying direction to hold down an upper surface of the sheet at one lateral edge thereof parallel with the sheet conveying direction to thereby prevent said one lateral edge of the sheet from floating, while said floating preventing member does not hold down a lateral edge on a side opposite to the record start position;
   a tail end detection means provided at an upstream of said first sheet convey means in the sheet conveying direction to recognize a position of a tail end of the sheet by detecting the tail end of the sheet being conveyed; and
   a control means for controlling the apparatus so that the sheet is passed through said second sheet convey means in a condition where said recording means is moved to a position outside the lateral edge opposite to the record start position of the sheet and stopped without returning to the record start position, after a last line recording is being effected by said recording means after the tail end of the sheet has been passed through said first sheet convey means and is released from the supporting of said first sheet convey means.

2. A recording apparatus according to claim 1, wherein said control means returns said recording means to a record start position after the sheet is conveyed and fed by said second sheet convey means in a condition in which said recording means is removed to a position outside of the other lateral edge of the sheet which sheet is prevented from floating by said floating preventing member.

3. A recording apparatus according to claim 1 or 2, wherein said recording means is of ink jet recording type in which a recording is effected by discharging ink in response to a signal.

4. A recording apparatus according to claim 3, wherein said recording means discharges the ink from a discharge opening by utilizing film-boiling caused in the ink by thermal energy applied by an electrothermal converter.

5. A method for controlling a recording apparatus including a first sheet convey means for conveying a sheet, a recording means provided at a downstream side, of said first sheet convey means in a sheet conveying direction to scan in a direction perpendicular to the sheet conveying, direction to record an image on the sheet, a second sheet convey means provided at a downstream side of said recording means in the sheet conveying direction to convey the sheet, and a detection means provided at an upstream side of said first sheet convey means in the sheet conveying direction to recognize a position of a tail end of the sheet by detecting the tail end of the sheet being conveyed, said method comprising:

a first step in which, (i) if the position of the tail end of the sheet is not detected by said detection means or (ii) it is recognized that the tail end of the sheet detected by said tail end detection means is not positioned at a downstream side of said first sheet convey means in the sheet conveying direction and the tail end of the sheet has been passed through said first sheet convey means and will not be released from said first sheet convey means in a sheet conveyance following a next scanning of said recording means, after one scanning of said recording means is finished, the sheet is conveyed by a predetermined amount and at the same time said recording means is returned to a record start position; and a second step in which, (i) if it is recognized that the tail end of the sheet detected by said tail end detection means is not positioned at the downstream side of the first sheet convey means in the sheet conveying direction and the tail end of the sheet is to be passed through said first sheet convey means to be released from the supporting of said first sheet convey means in the sheet conveyance after the next scanning of said recording means, and one further scanning of said recording means is required with respect to non-recorded image information, or, (ii) if it is recognized that the tail end of the sheet detected by said tail end detection means has been passed through said first sheet convey means to be released from the supporting of said first sheet convey means, the sheet is positioned within a record permitting area of said recording means, and if one further scanning of said recording means is required with respect to the non-recorded image information, after one scanning of said means is finished, said recording means is removed from the position of the lateral edge of the sheet by shifting said recording means toward a direction opposite to the record start position, and, thereafter, the sheet is discharged from the recording area of said recording means.

6. A controlling method according to claim 5, wherein (i) if it is recognized that the tail end of the sheet detected by said tail end detection means is not positioned at the downstream side of the first sheet convey means in the sheet conveying direction and the tail end of the sheet is to be passed through said first sheet convey means to be released from the supporting of said first sheet convey means in the sheet conveyance after the next scanning of said recording means, and two or more further scanning operations of said recording means are required with respect to non-recorded image information, or, (ii) if it is recognized that the tail end of the sheet detected by said tail end detection means has been passed through said first sheet convey means to be released from the supporting of said first sheet convey means, the sheet is positioned within a record permitting area of said recording means, and if two or more further scanning operations of said recording means are required with respect to the non-recorded image information, after the first scanning of said recording means is finished, said recording means is returned to the record start position and then the sheet is conveyed by the predetermined amount, and, thereafter, second scanning of said recording means is effected.

7. A recording apparatus comprising:

a first sheet convey means for conveying a sheet;

a recording means provided at a downstream side of said first sheet convey means in a sheet conveying direction to record an image having a predetermined length in the conveying direction on the sheet while scanning in a direction transverse to the sheet conveying direction;

a second sheet convey means provided at a downstream side of said recording means in the sheet conveying direction to convey the sheet;

means for scanning the recording means relative to a sheet to effect recording by said recording means in the transverse direction and for conveying the sheet by sub scanning the sheet in the sheet conveying direction by the predetermined length by means of at least one of said first and second sheet convey means being performed alternately; and a floating regulating member disposed between said first and second sheet convey means to regulate an upper surface of the sheet at one lateral edge thereof parallel with the sheet conveying direction to thereby regulate the floating of said one lateral edge of the sheet, while said floating regulating member does not regulate a lateral edge on a side opposite to a record start side;

wherein after the last scanning of said recording means to the sheet is finished, in a condition that said recording means is positioned out of a sheet passing area at another lateral edge opposite to said one lateral edge of the sheet which is regulated from floating by said floating regulating member, the sheet is conveyed to pass through said second sheet convey means, and wherein said recording means records the image on the sheet while shifting from said one lateral edge of the sheet which is regulated from floating by said floating regulating member to the other lateral edge.

8. A recording apparatus according to claim 7, wherein, when the sub scanning immediately before a last scanning is effected, if the tail end of the sheet the downstream side of said first sheet convey means after said sub scanning is finished, prior to initiation of said sub scanning, said recording means is shifted toward said one lateral edge of the sheet which is regulated from floating by said floating regulating member.

9. A recording apparatus according to claim 8, wherein, when the sub scanning immediately before the last scanning is effected, if the tail end of the sheet is positioned in the downstream side of said first sheet convey means before said sub scanning is started, prior to initiation of said sub scanning, said recording means is shifted toward said one lateral edge of the sheet which is regulated from floating by said floating regulating member.

10. A recording apparatus according to claim 8, wherein, when the sub scanning immediately before the last scanning is effected, if the tail end of the sheet is passed through said first sheet convey means during said sub scanning, prior to initiation of said sub scanning, said recording means is shifted toward said one lateral edge of the sheet which is regulated from floating by said floating regulating member.

11. A recording apparatus according to one of claims 7 to 10, wherein said recording means records the image on the sheet while shifting from said one lateral edge of the sheet which is regulated from floating by said floating regulating member to the other lateral edge.

12. A recording apparatus comprising:

a first sheet convey means for conveying a sheet;

a recording means provided at a downstream side of said first sheet convey means in a sheet conveying direction for recording an image having a predetermined length in the conveying direction on the sheet while scanning in a direction transverse to the sheet conveying direction;

a second sheet convey means provided at a downstream side of said recording means in the sheet conveying direction for conveying the sheet;

means for scanning the recording means relative to a sheet to effect recording by said recording means in the transverse direction and for conveying the sheet by sub scanning the sheet in the sheet conveying direction by the predetermined length by means of at least one of said first and second sheet convey means being performed alternately; and a floating regulating member disposed between said first and second sheet convey means for regulating an upper surface of the sheet at one lateral edge thereof parallel with the sheet conveying direction thereby to regulate the floating of said one lateral edge of the sheet while said floating regulating member does not regulate a lateral edge on a side opposite to a record start side; and wherein when the sub scanning is effected for next scanning, if the tail end of the sheet is to be positioned in the downstream side of said first sheet convey means after said sub scanning is finished, prior to initiation of said sub scanning, said recording means is shifted toward said one lateral edge of the sheet which is regulated from floating by said floating regulating member, and wherein said recording means records the image on the sheet while shifting from said one lateral edge of the sheet which is regulated from floating by said floating regulating member to the other lateral edge.

13. A recording apparatus according to claim 12, wherein, when the sub scanning is to be effected for next scanning, if the tail end of the sheet is positioned in the downstream side of said first sheet convey means before said sub scanning is started, prior to initiation of said sub scanning, said recording means is shifted toward said one lateral edge of the sheet from floating by said floating regulating member.

14. A recording apparatus according to claim 12, wherein, when the sub scanning is to be effected for next scanning, if the tail end of the sheet is passed through said first sheet convey means during said sub scanning, prior to initiation of said sub scanning, said recording means is shifted toward said one lateral edge of the sheet which is regulated from floating by said floating regulating member.

15. A recording apparatus according to claim 12, wherein said recording means records the image on the sheet while shifting from said one lateral edge of the sheet which is regulated from floating by said floating regulating member to another lateral edge.

16. A recording apparatus according to one of claims 7 to 10 and 12 to 15, wherein said recording means effect a recording by discharging ink in response to a signal.

17. A recording apparatus according to claim 16, wherein said recording means discharges the ink by utilizing thermal energy generated by an electrothermal converter.

* * * * *

UNITED STATES PATENT AND TRADEMARK OFFICE
CERTIFICATE OF CORRECTION

PATENT NO. : 6,231,159 B1            Page 1 of 1
DATED : May 15, 2001
INVENTOR(S) : Taniguro It is certified that error appears in the above-identified patent and that said Letters Patent is hereby corrected as shown below:

Drawings,
Sheet 7, Figure 8 at S4 and S17, "WITH CONVEY" should read -- WITH SHEET CONVEYANCE --.

Column 1,
Line 58, "electrodes liquid" should read -- electrodes, liquid --.

Column 2,
Line 21, "conveyed the" should read -- conveyed to the --.

Column 3,
Line 3, "has" should read -- have --.

Column 11,
Line 38, "Pt" should read -- P1 --.

Column 13,
Line 7, "conveying," should read -- conveying --.

Column 14,
Line 33, "side;" should read -- side, --.
Line 47, "sheet the downstream" should read -- sheet is positioned in the downstream --.

Column 15,
Line 29, "sheet" should read -- sheet, --.
Line 31, "side;" should read -- side, --.

Signed and Sealed this

Eighth Day of January, 2002

*Attest:*

JAMES E. ROGAN
*Attesting Officer*      *Director of the United States Patent and Trademark Office*